(12) United States Patent
Sugisawa

(10) Patent No.: US 6,907,327 B2
(45) Date of Patent: Jun. 14, 2005

(54) METHOD OF DETECTION OF LIMITED SLIP DIFFERENTIAL DEVICE, METHOD AND APPARATUS FOR DETECTING DECREASE IN TIRE AIR-PRESSURE EMPLOYING THE METHOD OF DETECTION, AND PROGRAM FOR JUDGING DECOMPRESSION OF TIRE

(75) Inventor: Toshifumi Sugisawa, Kobe (JP)

(73) Assignees: Sumitomo Rubber Industries, Ltd., Kobe (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/330,141

(22) Filed: Dec. 30, 2002

(65) Prior Publication Data
US 2003/0128110 A1 Jul. 10, 2003

(30) Foreign Application Priority Data
Jan. 9, 2002 (JP) .................................. 2002-002293

(51) Int. Cl.[7] ................................................ G06F 7/00
(52) U.S. Cl. ....................... 701/29; 701/69; 701/74; 340/442; 73/146.2
(58) Field of Search ................ 701/29, 35, 69, 701/74; 340/442, 443, 444; 73/146.2, 146.8

(56) References Cited

U.S. PATENT DOCUMENTS

| | | | | | |
|---|---|---|---|---|---|
| 6,137,400 | A | * | 10/2000 | Yanase et al. | 340/442 |
| 6,317,667 | B1 | * | 11/2001 | Oshiro | 701/29 |
| 6,339,957 | B1 | * | 1/2002 | Yanase et al. | 73/146 |
| 6,529,851 | B1 | * | 3/2003 | Oshiro | 702/148 |

FOREIGN PATENT DOCUMENTS

| | | |
|---|---|---|
| JP | 8-145654 | 6/1996 |
| JP | 9-66714 | 3/1997 |
| JP | 10-100620 | 4/1998 |

* cited by examiner

Primary Examiner—Gertrude A. Jeanglaude
(74) Attorney, Agent, or Firm—Birch Stewart Kolasch & Birch, LLP

(57) ABSTRACT

A method of detection of the limited slip differential device, wherein it is detected whether a vehicle is mounted with a limited slip differential device on the basis of a relationship between a lateral directional acceleration of a vehicle calculated by using rotational information obtained from tires attached to the vehicle or on the basis of a turning radius of the vehicle, and a specified judged value. It is possible to improve performance and safety of the vehicle since it is possible to accurately judge decrease in internal pressure of a tire.

8 Claims, 4 Drawing Sheets

METHOD OF DETECTION OF LIMITED SLIP DIFFERENTIAL DEVICE, METHOD AND APPARATUS FOR DETECTING DECREASE IN TIRE AIR-PRESSURE EMPLOYING THE METHOD OF DETECTION, AND PROGRAM FOR JUDGING DECOMPRESSION OF TIRE

This nonprovisional application claims priority under 35 U.S.C. § 119(a) on Patent Application No. 2002-002293 filed in JAPAN on Jan. 9, 2002, which is herein incorporated by reference.

BACKGROUND OF THE INVENTION

The present invention relates to a method of detection of a limited slip differential device, a method and an apparatus for detecting decrease in tire air-pressure employing the method of detection and to a program for judging decompression of a tire. More particularly, it relates to a method of detection of a limited slip differential device, a method and an apparatus for detecting decrease in tire air-pressure employing the method of detection and to a program for judging decompression of a tire with which it is possible to detect whether a limited slip differential (LSD) device is mounted or not and to accurately judge decrease in internal pressure of a tire of the vehicle.

It is conventionally known that a decrease in air-pressure of a tire results in a reduction in the dynamic load radius of the tire so that the rotational velocity or the rotational angular velocity becomes faster when compared to a tire of normal air-pressure. Various methods for detecting decrease in internal pressure on the basis of relative differences in rotational angular velocities of the tires have been proposed (reference should be made to Japanese Unexamined Patent Publication No. 100620/1998, Japanese Unexamined Patent Publication No. 66714/1997, Japanese Unexamined Patent Publication No. 164720/1996 and Japanese Unexamined Patent Publication No. 145654/1996 and others). From among those techniques, the apparatus for detecting decrease in tire air-pressure (DWS) as recited in Japanese Unexamined Patent Publication No. 100620/1998 is so arranged that upon judging that a decompressed wheel when the vehicle is running on a corner is a following wheel, a turning radius is obtained from the rotational angular velocity of the driving wheels, a lateral directional acceleration when running on a corner (hereinafter referred to as "lateral G") is calculated on the basis of the turning radius, and the judged value is calculated on the basis of the lateral G including no errors by employing a specified threshold.

However, some of the current vehicles are mounted with a limited slip differential device at a differential gear of a driving shaft for the purpose of improving running performances on cornering or the like. A limited slip differential device is functionally so arranged that differential is limited until a differential torque exceeds a set value and the driving wheels rotate at identical speeds on the right and left. In a vehicle mounted with such a device, the rotational angular velocity on the outer side of the turning will be slower than the original rotational angular velocity due to influences of the limited slip differential device so that the turning radius is calculated to be larger than it actually is. Since errors are accordingly generated in judged values, it will be impossible to accurately judge decrease in internal pressure. Moreover, since actions of the right and left wheels will be restricted by the function of the LSD when one of the driving wheels has decompressed, a rotational difference between right and left wheels which shall be caused through the difference in air pressure will be smaller than it should normally be. The threshold of decompression of the driving wheels of a vehicle mounted with such a LSD should accordingly be set to be smaller than a threshold for vehicle which is not mounted with a LSD.

In this manner, a LSD largely affects performances of the DWS. Thus, if the LSD is a standard accessory of a vehicle, design shall be performed on the premise that the LSD is mounted. However, if the LSD is optionally mounted to a vehicle, a microcomputer into which a DWS capable of corresponding to the LSD needs to be mounted to the vehicle upon mounting LSD thereto, while a microcomputer with a DWS which does not correspond to the LSD is mounted to a vehicle which is not mounted with a LSD.

Such a DWS is often mounted to a microcomputer of an ABS. However, it is operationally difficult to distinguish an ABS microcomputer on the basis of use and non-use of a LSD.

SUMMARY OF THE INVENTION

In view of the above facts, it is an object of the present invention to provide a method of detection of a limited slip differential device, a method and an apparatus for detecting decrease in tire air-pressure employing the method of detection and to a program for judging decompression of a tire with which it is possible to detect whether a limited slip differential device is mounted or not and to accurately judge decrease in internal pressure of a tire of the vehicle.

According to one aspect of the present invention, there is provided a method of detection of the limited slip differential device, wherein it is detected whether a vehicle is mounted with a limited slip differential device on the basis of a relationship between a lateral directional acceleration of a vehicle calculated by using rotational information obtained from tires attached to the vehicle or a turning radius of the vehicle, and a specified judged value.

According to a second aspect of the present invention, there is provided a method for detecting decrease in air-pressure of a tire to detect decrease in internal pressure of the tire on the basis of rotational information obtained from tires attached to a vehicle, including the steps of: detecting rotational information of the respective tires; storing the rotational information of the respective tires; calculating a lateral directional acceleration of the vehicle or a turning radius of the vehicle; detecting whether the vehicle is mounted with a limited slip differential device on the basis of a relationship between the lateral directional acceleration or the turning radius and a specified judged value; and judging decrease in air-pressure of the tire by selecting a threshold for judging decompression on the basis of the detection.

According to a third aspect of the present invention, there is provided an apparatus for detecting decrease in air-pressure of a tire to detect decrease in internal pressure of a tire on the basis of rotational information obtained from tires attached to a vehicle, including: rotational information detecting means for detecting rotational information of the respective tires; a storing means for storing the rotational information of the respective tires; a first calculating means for calculating a lateral directional acceleration of the vehicle or a turning radius of the vehicle; a mount detecting means for detecting whether the vehicle is mounted with a limited slip differential device on the basis of a relationship between the lateral directional acceleration or the turning radius and a specified judged value; and a decompression judging means for judging decrease in air-pressure of the tire by selecting a threshold for judging decompression on the basis of the detection.

According to a fourth aspect of the present invention, there is provided a program for judging decompression of a tire, in which to judge decrease in air-pressure of a tire, a computer is made to function as a storing means for storing the rotational information of the respective tires; a first calculating means for calculating a lateral directional acceleration of the vehicle or a turning radius of the vehicle; a mount detecting means for detecting whether the vehicle is mounted with a limited slip differential device on the basis of a relationship between the lateral directional acceleration or the turning radius and a specified judged value; and a decompression judging means for judging decrease in air-pressure of the tire by selecting a threshold for judging decompression on the basis of the detection.

DETAILED DESCRIPTION

The method of detection of a limited slip differential device, the method and apparatus for detecting decrease in tire air-pressure employing the method of detection and the program for judging decompression of a tire will now be explained with reference to the accompanying drawings.

Figure 1:
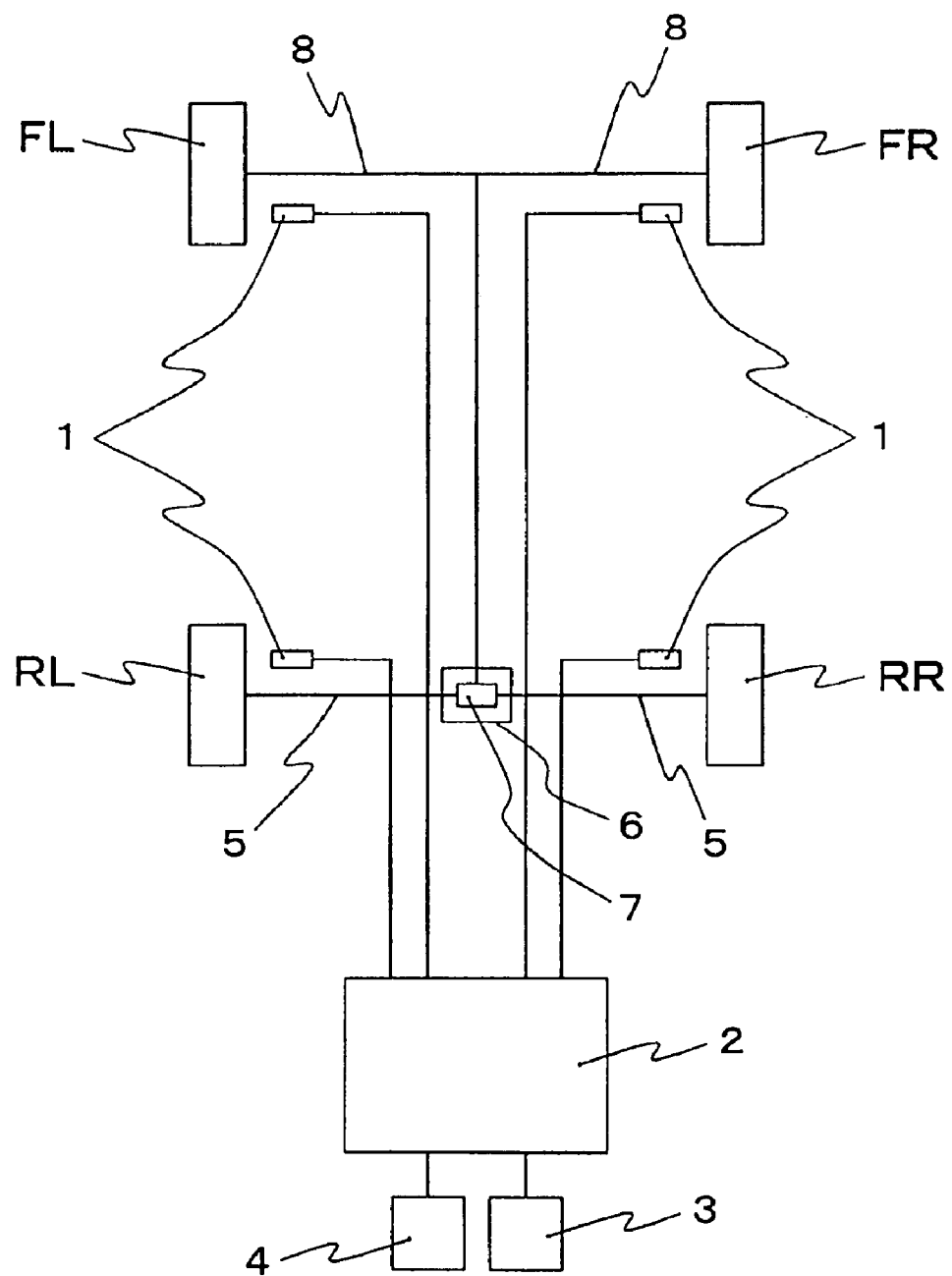
FIG. 1 is a block diagram illustrating one embodiment of an apparatus for detecting decrease in tire air-pressure according to the present invention.

As illustrated in FIG. 1, the apparatus for detecting decrease in tire air-pressure according to one embodiment of the present invention is for detecting whether an air-pressure of four tires FL, FR, RL and RR (generally referred to as Wi, wherein i=1 to 4, 1: front left tire, 2: front right tire, 3: rear left tire and 4: rear right tire) mounted to a four-wheeled vehicle is reduced or not, and comprises ordinary rotational information detecting means 1 provided in relation to the respective tires Wi.

The rotational information detecting means 1 might be a wheel speed sensor for measuring wheel speeds (rotational speeds) on the basis of number of pulses upon generating rotational pulses by using an electromagnetic pickup or similar, or an angular velocity sensor in which power is generated by using rotation such as in a dynamo whereupon the wheel speeds are measured by using this voltage. Outputs of the rotational information detecting means 1 are sent to a control unit 2 comprising a computer such as an ABS. A display 3 composed of liquid crystal elements, plasma display elements or CRT to display decompressed tires Wi, and an initialization switch which can be operated by a driver are connected to the control unit 2. The four-wheeled vehicle according to this embodiment is a FR (front-engine rear-drive) vehicle with a limited slip differential device 7 being mounted to a differential gear 6 of a driving shaft 5. It should be noted that reference numeral 8 denotes a following shaft.

Figure 2:
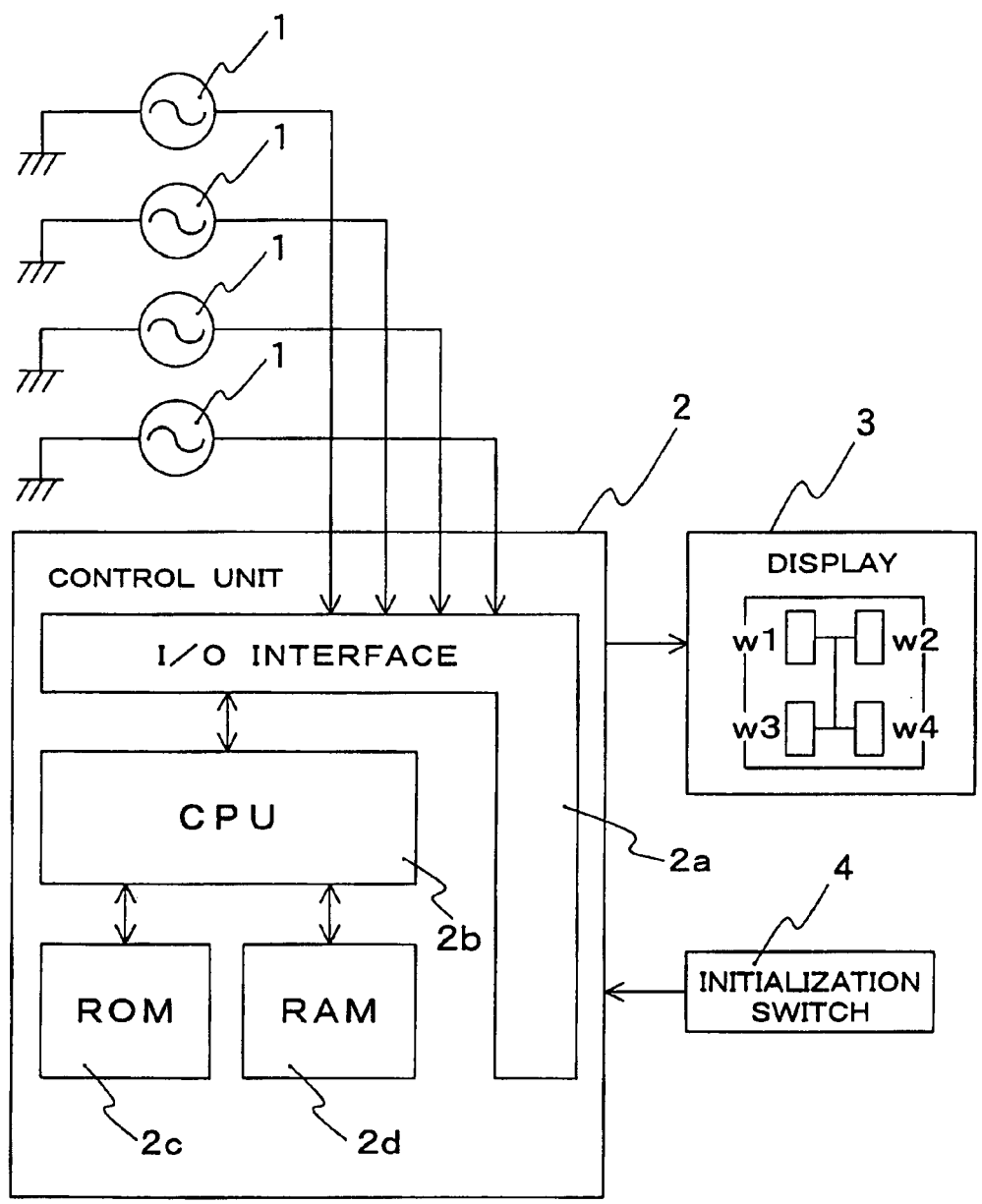
FIG. 2 is a block diagram illustrating electric arrangements of the apparatus for detecting decrease in tire air-pressure of FIG. 1.

The control unit 2 comprises, as illustrated in FIG. 2, an I/O interface 2a required for sending/receiving signals to/from an external device, a CPU 2b which functions as a center of calculation, a ROM 2c which stores a control operation program for the CPU 2b, and a RAM 2d into which data are temporally written and are read out therefrom when the CPU 2b performs control operations.

The present embodiment is composed of rotational information detecting means 1 for detecting rotational information of the respective tires, a storing means for storing the rotational information of the respective tires, a first calculating means for calculating a lateral directional acceleration of the vehicle or a turning radius of the vehicle, a mount detecting means for detecting whether the vehicle is mounted with a limited slip differential device on the basis of magnitude of inclination of a linear equation obtained from a relationship between the lateral directional acceleration or the turning radius and a specified judged value, and a decompression judging means for judging decrease in air-pressure of the tire by selecting a threshold for judging decompression on the basis of the detection.

Pulse signals corresponding to the rotational number of tires Wi (hereinafter referred to as "wheel speed pulse") are output from the rotational information detecting means 1. In the CPU 2b, rotational angular velocities $F_i$ for respective tires Wi are calculated on the basis of the wheel speed pulses as output from the wheel speed sensors 1 at specified sampling periods $\Delta T(sec)$, for instance, $\Delta T=1$.

Since the tires Wi are manufactured to include variations (initial differences) within standards, effective rolling radius of the respective tires Wi (a value obtained by dividing a distance which has been traveled by a single rotation by $2\pi$) are not necessarily identical to one another even though all of the tires Wi are under normal internal pressure. This will result in variations in the rotational angular velocities $F_i$ of the respective tires Wi. Thus, corrected rotational angular velocities $F1_i$ to cancel variations owing to initial differences are calculated. More particularly, corrections are performed to satisfy $F1_1=F_1$ $F1_2=mF_2$ $F1_3=F_3$ $F1_4=nF_4$ The correction coefficients m and n are obtained as $m=F_1/F_2$ and $n=F_3/F_4$ on the basis of rotational angular velocities $F_i$ which have been calculated on the premise that the vehicle is performing straight-ahead driving. The wheel speed Vi of the tires of the respective wheels is calculated on the basis of the above F1.

The program for judging decompression of a tire according to the present embodiment is so arranged that a control unit 2 is made to function as the storing means for storing the rotational information of the respective tires Wi, the first calculating means for calculating a lateral directional acceleration of the vehicle or a turning radius of the vehicle, the mount detecting means for detecting whether the vehicle is mounted with a limited slip differential device on the basis of a relationship between the lateral directional acceleration or the turning radius and a specified judged value, and the decompression judging means for judging decrease in air-pressure of the tire by selecting a threshold for judging decompression on the basis of the detection.

The judged values of decompression (DEL) for detecting decrease in air-pressure of the tires Wi are not obtained by employing a particularly limited equation but might be obtained, on the basis of the following equation, as a value in which a difference between average values of sums of rotational information of two wheels respectively disposed on diagonal lines of the wheels of the four-wheeled vehicle is divided by an average value of rotational information of the four wheels. It might alternatively be a value obtained by employing an equivalent equation of this equation.

$$DEL=\{(F1+F4)/2-(F2+F3)/2\}/\{(F1+F2+F3+F4)/4\}\times100(\%)$$

It is then determined whether a limited slip differential device is being mounted or not on the basis of magnitude of inclination of a linear equation obtained from a relationship between the lateral directional acceleration or a turning radius and a judged value.

The turning radius is calculated from the wheel speed of the following wheels. For instance, when the vehicle is running on a left-turn corner, the driving wheel tire RL inside of the corner is apt to slip and thus inappropriate for accurately calculating the turning radius so that only the speeds V1, V2 of the following wheel tires FL and FR are calculated. The turning radius R is accordingly calculated.

$$R=\{(V1_2+V1_1)/(V1_2-V1_1)\}\times T_W/2$$

Here, $T_W$ denotes a distance between kingpins (tread width)(m).

The lateral G of the vehicle is calculated from the following equation on the basis of the turning radius R of the vehicle.

$$\text{Lateral } G=V^2/(R\times9.8)$$

It should be noted that 9.8 is introduced to the denominator for performing g-conversion of the lateral directional acceleration.

The LSD constraints the right and left driving wheels at constant force when the vehicle is performing turning movements. Accordingly, the rate of the wheel speeds of the right and left wheel of the driving wheels is smaller than that of the following wheels when the vehicle is performing turning movements.

In the equation of DEL, the differences in wheel speeds owing to turning are neutralized also when the vehicle is actually making turning movements, and the DEL will become a value which is substantially zero.

Thus, the values for constants A and B in $$DEL=A\times\text{lateral } G$$

$$DEL=B\times\text{turning radius } R$$

are small.

However, when the vehicle is mounted with a LSD, the driving wheels will be restrained at a certain force during turning movements so that no neutralization is performed in the equation of DEL but the value will become large.

Thus, the values for constants A and B in $$DEL=A\times\text{lateral } G$$

$$DEL=B\times\text{turning radius } R$$

will be large.

It can be judged whether the vehicle is mounted with a LSD or not on the basis of the degree of the values for the constants A and B.

While the present invention will now be explained on the basis of an example thereof, the present invention is not to be limited to such an example only.

EXAMPLE

A small-sized roofless truck (pickup truck: displacement of 4.7 liter) mounted with a LSD (hereinafter referred to as "vehicle mounted with LSD") and a small-sized roofless truck which is not mounted with a LSD (hereinafter referred to as "vehicle not mounted with LSD") were prepared.

Figure 3:
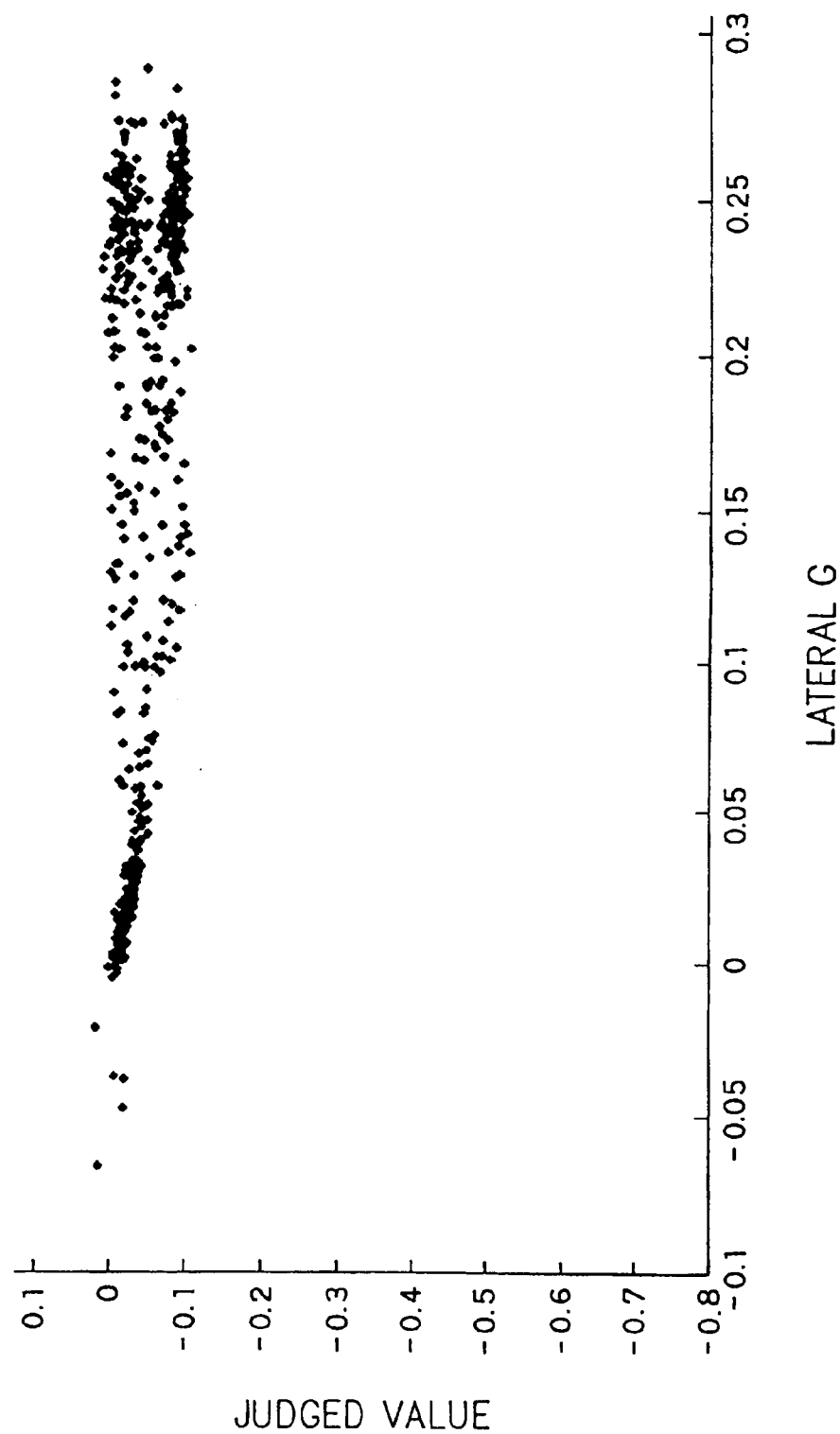
FIG. 3 is a view illustrating relationships between judged values and lateral G of a vehicle which is not mounted with a LSD.
Figure 4:
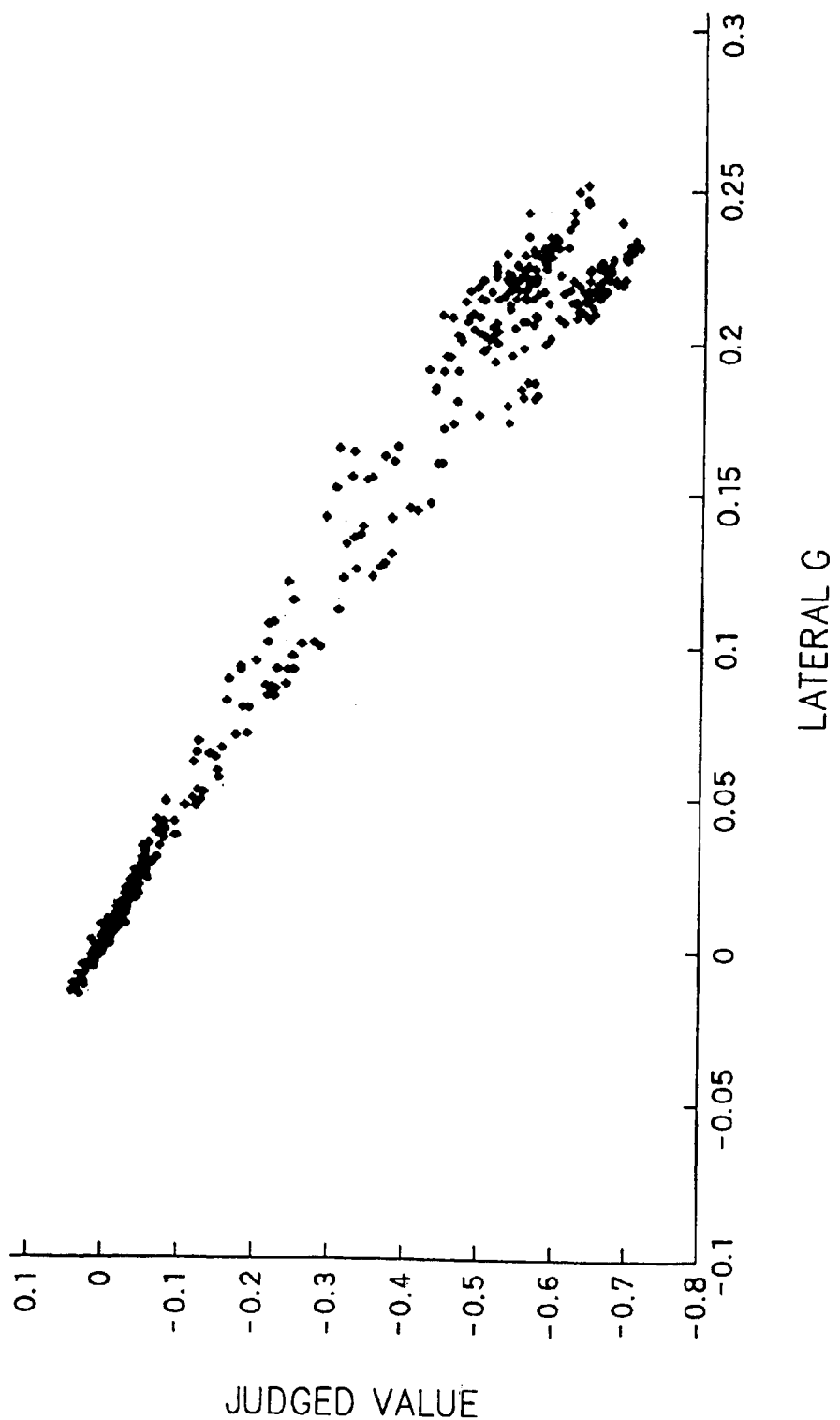
FIG. 4 is a view illustrating relationships between judged values and lateral G of a vehicle which is mounted with a LSD.

Both of the vehicle mounted with LSD and the vehicle not mounted with LSD were respectively made to run on an oval course at 80 km/h under normal air-pressure. The following equation could be obtained from FIGS. 3 and 4 upon calculating values for lateral G and judged values (DEL) from the detected wheel speeds for the vehicle mounted with LSD and the vehicle not mounted with LSD.

Vehicle not mounted with LSD: $DEL=-0.8\times\text{lateral } G$

Vehicle mounted with LSD: $DEL=-2\times\text{lateral } G$

It is known that in a vehicle mounted with LSD, a judged value obtained when the air-pressure of a driving wheel tire (RR) has decompressed by 40% will be decreased by 30% of a judged value when obtained under normal air-pressure. Thus, when it has been determined that the vehicle is a vehicle mounted with LSD and that the driving wheel tire is decompressed, the DWS employing the method for detection of LSD has been provided with a program for decreasing the threshold for alarm (alarm threshold) by 30%.

Then, an alarm threshold corresponding to a case in which the air-pressure of the driving wheel tire (RR) has decompressed by 40% is set to be 0.1. The alarm threshold when the value for the constant A is not less than 1.5 and when it has been judged that the driving wheel tire has been decompressed by 40% is changed to 0.07.

In contrast thereto, a general DWS(employing no method for detection of LSD) was mounted to the vehicle mounted with LSD and to the vehicle not mounted with LSD (Comparative Example). The alarm threshold is 0.1 for both of them.

A study run of approximately one hour was performed on the oval course for the vehicle mounted with LSD and the vehicle not mounted with LSD as a method for testing, and it was tested whether an alarm was issued upon performing running for 20 minutes with the air-pressure of the driving wheel tire (RR) being reduced by 40%. The results are shown in Table 1. It should be noted that only data of linear portions were employed for judging alarm of decrease in air-pressure while data of turning portions were employed only for determining whether the vehicle is mounted with a LSD or not.

TABLE 1

|  | Vehicle mounted with LSD RR-40% | Vehicle not mounted with LSD RR-40% |
| --- | --- | --- |
| EXAMPLE | Issuance of alarm. | Issuance of alarm. |
| COMPRATIVE EXAMPLE | No issuance of alarm. | Issuance of alarm. |

As explained so far, according to the present invention, it is possible to switch constants or decompression judging logics between vehicles mounted with LSD and those not mounted with LSD since it is possible to detect whether the vehicle is mounted with a LSD or not. With this arrangement, it is possible to improve performance and safety of the vehicle since it is possible to accurately judge decrease in internal pressure of a tire.

What is claimed is:

1. A method of detection of the limited slip differential device, wherein it is detected whether a vehicle is mounted with a limited slip differential device on the basis of a relationship between a lateral directional acceleration of a vehicle calculated by using rotational information obtained from tires attached to the vehicle or a turning radius of the vehicle, and a specified judged value, wherein the basis is a magnitude of inclination of a linear equation obtained from a relationship between the lateral directional acceleration or the turning radius and a specified judged value.

2. The method of claim 1, wherein the judged value is a value obtained by using an equation in which a difference between average values of sums of rotational information of two wheels respectively disposed on diagonal lines of the wheels of the four-wheeled vehicle is divided by an average value of rotational information of the four wheels, or other equations which are equivalent to the equation.

3. A method for detecting decrease in air-pressure of a tire to detect decrease in internal pressure of the tire on the basis of rotational information obtained from tires attached to a vehicle, comprising the steps of:

detecting rotational information of the respective tires;

storing the rotational information of the respective tires;

calculating a lateral directional acceleration of the vehicle or a turning radius of the vehicle;

detecting whether the vehicle is mounted with a limited slip differential device on the basis of a relationship between the lateral directional acceleration or the turning radius and a specified judged value; and judging decrease in air-pressure of the tire by selecting a threshold for judging decompression on the basis of the detection, wherein the basis is a magnitude of inclination of a linear equation obtained from a relationship between the lateral directional acceleration or the turning radius and a specified judged value.

4. The method of claim 3, wherein the judged value is a value obtained by using an equation in which a difference between average values of sums of rotational information of two wheels respectively disposed on diagonal lines of the wheels of the four-wheeled vehicle is divided by an average value of rotational information of the four wheels, or other equations which are equivalent to the equation.

5. An apparatus for detecting decrease in air-pressure of a tire to detect decrease in internal pressure of a tire on the basis of rotational information obtained from tires attached to a vehicle, comprising:

rotational information detecting means for detecting rotational information of the respective tires;

a storing means for storing the rotational information of the respective tires;

a first calculating means for calculating a lateral directional acceleration of the vehicle or a turning radius of the vehicle;

a mount detecting means for detecting whether the vehicle is mounted with a limited slip differential device on the basis of a relationship between the lateral directional acceleration or the turning radius and a specified judged value; and a decompression judging means for judging decrease in air-pressure of the tire by selecting a threshold for judging decompression on the basis of the detection, wherein the basis is a magnitude of inclination of a linear equation obtained from a relationship between the lateral directional acceleration or the turning radius and a specified judged value.

6. The apparatus of claim 5, wherein the judged value is a value obtained by using an equation in which a difference between average values of sums of rotational information of two wheels respectively disposed on diagonal lines of the wheels of the four-wheeled vehicle is divided by an average value of rotational information of the four wheels, or other equations which are equivalent to the equation.

7. A program for judging decompression of a tire, in which to judge decrease in air-pressure of a tire, a computer is made to function as a storing means for storing the rotational information of the respective tires; a first calculating means for calculating a lateral directional acceleration of the vehicle or a turning radius of the vehicle; a mount detecting means for detecting whether the vehicle is mounted with a Limited slip differential device on the basis of a relationship between the lateral directional acceleration or the turning radius and a specified judged value; and a decompression judging means for judging decrease in air-pressure of the tire by selecting a threshold for judging decompression on the basis of the detection, wherein the basis is a magnitude of inclination of a linear equation obtained from a relationship between the lateral directional acceleration or the turning radius and a specified judged value.

8. The program claim 7, wherein the judged value is a value obtained by using an equation in which a difference between average values of sums of rotational information of two wheels respectively disposed on diagonal lines of the wheels of the four-wheeled vehicle is divided by an average value of rotational information of the four wheels, or other equations which are equivalent to the equation.

* * * * *